UNITED STATES PATENT OFFICE.

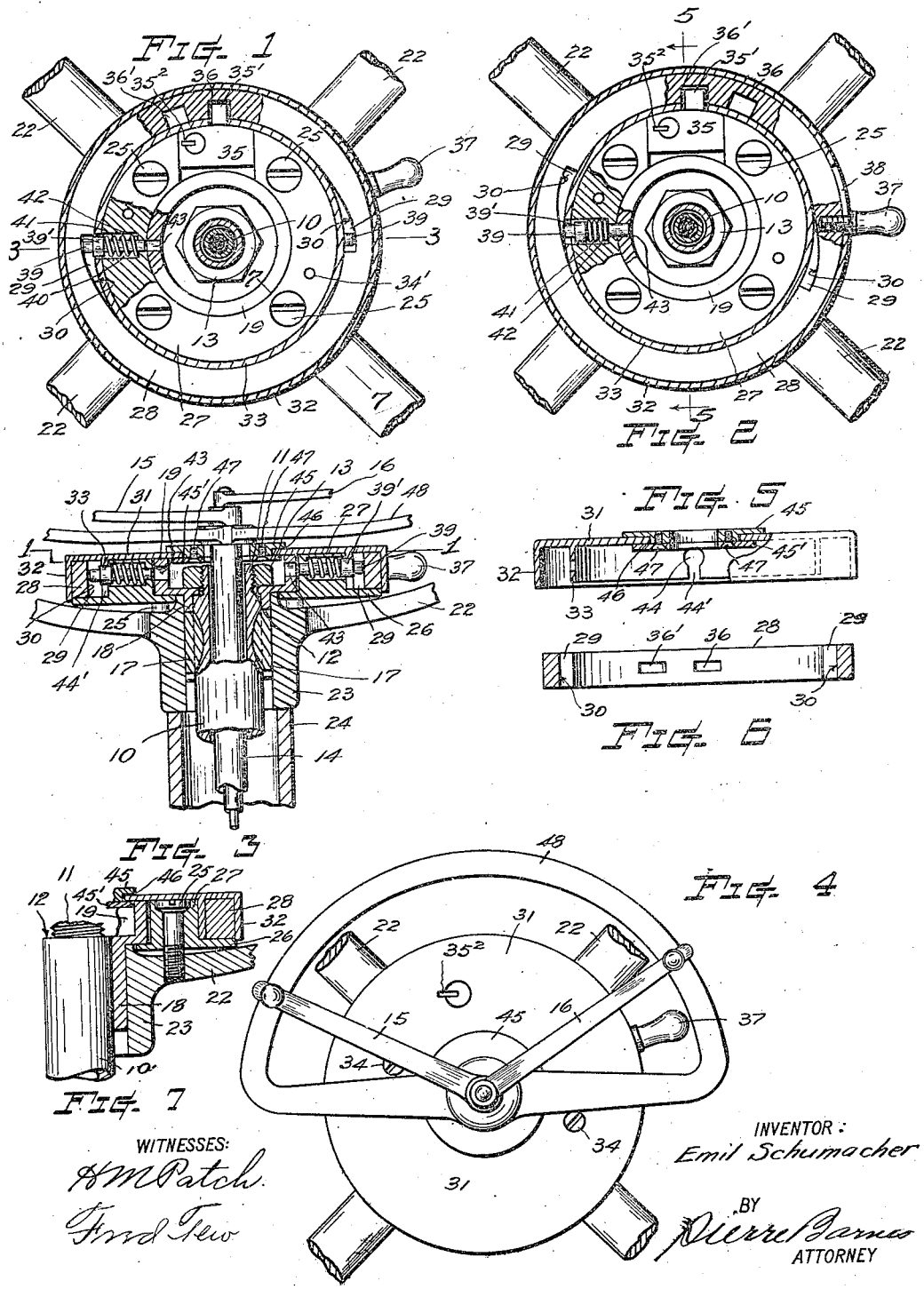

EMIL SCHUMACHER, OF SEATTLE, WASHINGTON.

AUTOMOBILE-STEERING-WHEEL LOCK.

1,257,031.      Specification of Letters Patent.      Patented Feb. 19, 1918.

Application filed July 12, 1917. Serial No. 180,036.

*To all whom it may concern:*

Be it known that I, EMIL SCHUMACHER, a citizen of the United States, residing at Seattle, in the county of King and State of Washington, have invented certain new and useful Improvements in Automobile-Steering-Wheel Locks, of which the following is a specification.

This invention relates to devices for releasably connecting the steering wheel to the steering post of an automobile.

The object of the invention is to provide efficient and conveniently regulated means to prevent an automobile from being stolen by rendering the steering mechanism temporarily inoperable.

The invention consists in the novel construction, adaptation and combination of parts, as will be hereinafter described and claimed.

In the accompanying drawings, Figure 1 is a fragmentary horizontal sectional view of a steering wheel embodying my invention, said section being taken substantially through 1—1 of Fig. 3, and illustrating the wheel coupling devices in disengaged positions with respect to the steering post. Fig. 2 is a similar view with the devices in position to enable the wheel to be utilized for steering purposes. Fig. 3 is a sectional view through 3—3 of Fig. 1. Fig. 4 is a top plan view of a portion of a steering wheel with the present invention applied thereto. Fig. 5 is a detached elevational view of the casing cover member shown partly in section on line 5—5 of Fig. 2. Fig. 6 is a detached sectional view of the cam member of the invention, the section being taken through 3—3 of Fig. 1. Fig. 7 is a detail sectional view through 7—7 of Fig. 1.

The reference numeral 10 designates a steering post having a reduced upper portion 11 extending above a shoulder 12, said reduced portion being screw-threaded, as shown in Fig. 3, to receive a nut 13. In the illustrated embodiment said post is of the hollow type to accommodate a tube 14 containing the connection for the so-called spark and throttle "controls" which are operated by means of lever arms 15 and 16.

Splined by a key or keys 17 to said post, is the depending sleeve element 18 of a head 19 which is adapted to seat upon the post shoulder 12 and be held in place by the nut 13.

22 represents the spokes of the steering wheel, whose hub 23 is journaled on said sleeve between the underside of the head 19 and the upper end of the column 24.

Rigidly secured by screws 25 to the wheel is a casing having a disk element 26 extending below the head 19 and with a ring element 27 which surrounds the same. Rotatably mounted upon the casing element 26 outside of the ring element 27, is an annulus 28 having diametrically opposite recesses 29 in its inner periphery formed with faces 30 arranged tangentially, or nearly so, with respect to the inner peripheral surface of the annulus. Said casing includes a cover member comprising a centrally apertured top plate element 31 with concentrically arranged flange elements 32, 33; the former surrounds the aforesaid annulus and the other, 33, extends into the circular space between the annulus and the casing ring element 27.

34 represent screws extending through the cover plate 31 into threaded holes $34^1$ of the ring element 27 for fastening the two casing members together. Said ring element is recessed to receive a lock, indicated by 35, having a lock-bolt $35^1$ controlled by a suitable key insertible in the key-slot $35^2$ to shoot the bolt into either of the sockets 36 or $36^1$ provided therefor in the annulus 28 for securing it in selected rotary positions with respect to the casing, or to retract the bolt when the annulus is to be regulated, as by means of an attached finger knob 37 extending through a slot 38 provided in the casing flange element 32.

For coupling the post and wheel, I provide plungers 39 arranged for reciprocatory movements in radially disposed chambers 40 of the casing ring element 27, each plunger being urged outwardly by means of a spring 41 interposed between a shoulder 42 of a chamber and a collar $39^1$ provided on the respective plunger and adjacent to its outer end.

The plungers are of lengths to extend from the outer periphery of the casing element 33 into sockets 43 provided therefor in the head 19 and, when thus disposed, serve to couple the wheel to the steering post.

The plunger-receiving apertures in the casing element 33 are each formed with an upper portion 44 of a diameter sufficiently large to accommodate the collar $39^1$ of the respective plunger and communicates from below with a slot 44¹ (Fig. 5) of less diameter than said collar. By such devices it is evident that the cover member of the casing can be detached only when the collars of the plungers are displaced from the relatively large parts 44 of the apertures, as represented in Fig. 2, and which will obtain only when the wheel is coupled by the plungers to the post.

To render the cover member temporarily inseparable from the other member of the casing and also to enable the springs 41 to effect the withdrawal of the plungers from the head 19, the annulus 28 is rotatably moved through the instrumentality of the knob 37 to present the recesses 29 to the plungers, whereupon the plungers are moved into the positions wherein they are illustrated in Fig. 1 to thereby uncouple the wheel so that it cannot be used for steering purposes. The wheel is coupled by reversely turning the annulus into the position in which it is shown in Fig. 2. In such movement the relatively inclined faces 30 of the recesses 29, acting as cam elements, force the plungers inwardly into head-engaging positions in opposition to the springs. The annulus is secured in its Fig. 1 position by the lock bolt 35¹ being engaged in the socket 36, and may be locked in its other position (Fig. 2), by the bolt engaging in the other slot 36¹.

Where the cover plate 31 is apertured, as in the illustrated example, for the accommodation of the aforesaid controls, the aperture is preferably made relatively large and its effective opening reduced in size by means of a guard which is connected for independent rotary movements to the plate element 31 of the casing cover. Such guard, as shown in Fig. 3, is formed of an annular plate 45 having in its underside a rabbet 46 to receive the inner peripheral portion of the element 31; and a second plate 45¹ of greater diameter than the aperture of such element 31 and below the latter secured to the plate 45 by screws 47.

The principal functions of the guard are to afford rotary movements to the wheel without encountering set screws or other devices which may be utilized to secure the "quadrant" or frame 48 to the non-rotatable tube 14; and to prevent the insertion of a nail or other instrument into the casing in a manner to tamper with the plungers or lock the casing to the head 19 for coupling the wheel to the steering post.

It may be stated that in applications where the referred to controls do not extend above the steering wheel, the aperture in the center of the cover element 31 would be superfluous and the element may accordingly be made imperforate or the guard itself made without a central hole.

The construction and operation of the invention will, it is thought, be understood from the foregoing description.

What I claim, is—

1. In a vehicle, the combination with a steering post and a steering wheel mounted thereon for independent rotary movement, of a casing secured to the steering wheel, mechanism provided in the casing for securing the steering wheel to the steering post, said mechanism including a rotatable post, said mechanism including a rotatable annulus having cam faces, and a pair of detents controlled thereby, means extending outside of the casing to selectively cause said mechanism to become operative or inoperative, a lock for securing said mechanism in adjusted relations, and a key for controlling the action of said lock.

2. In a vehicle, a steering wheel, a casing secured thereon, a steering post, a sleeve rigidly secured to the post and having an apertured head element within said casing, devices provided in said casing and engageable with said head element for coupling the wheel to the post, springs to yieldingly retain said devices in disengaged positions, a cam within said casing and adapted to be moved into position to effect the engagement of said devices with the head element, and means for locking said cam element to the casing when the wheel is coupled with or disengaged from the post.

3. In a vehicle, a steering wheel, a casing secured thereon, a steering post, a sleeve rigidly secured to the post, and having an apertured head element within said casing, devices mounted for reciprocatory movements in said casing and engageable with the apertures of said head element for coupling the wheel to the post, springs to yieldingly retain said devices in disengaged positions, a cam within said casing and adapted to be moved into position to effect the engagement of said devices with the head element, and means for releasably securing said cam in position to render said springs operable.

4. In a vehicle, the combination with a steering wheel and a casing comprising two members, one of said members being rigidly secured to the wheel, of a steering post, an attachment rigidly secured to said post, a plunger provided in the casing for releasably coupling said casing members together and also serving to releasably couple the wheel to the post through the medium of the casing and said attachment, a spring tending to render said means operable to couple said casing members together, and means for regulating said plunger whereby the latter may be influenced to cause it to couple the wheel and post and thereby become inoperative to couple the casing members together.

5. In a vehicle, the combination with a hollow steering post having engine-controlling devices extending therethrough, a steering wheel mounted for independent rotary movements on said post, a casing having a member rigidly connected to said wheel, a cover member separably connected to the aforesaid member, said cover member being provided with an aperture, means provided in the casing for releasably securing the same to the post, means for regulating the actions of the above-named means, and a guard for protecting the said means, said guard consisting of an annular plate rotatably connected to said cover member so as to reduce the effective area of said aperture.

6. The combination with a steering post of a vehicle, and a head rigidly secured thereto, of a steering wheel, a casing comprising two members, one of said members being rigidly secured to said wheel, plungers provided at diametrically opposite sides of the casing, springs tending to effect the disengagement of the plungers between said casing and the head, rotary means provided in the casing to render said plungers temporarily inoperable to secure the casing to the head, means to regulate said means, and a lock for securing said rotary means in positions whereby the springs serve to retain the plungers in disengaged positions with respect to the wheel.

Signed at Seattle, Wash., this 2nd day of July, 1917.

EMIL SCHUMACHER.

Witnesses:
   E. PETERSON,
   PIERRE BARNES.